No. 847,036. PATENTED MAR. 12, 1907.
J. F. WILLIAMS.
HARROW.
APPLICATION FILED JULY 12, 1906.
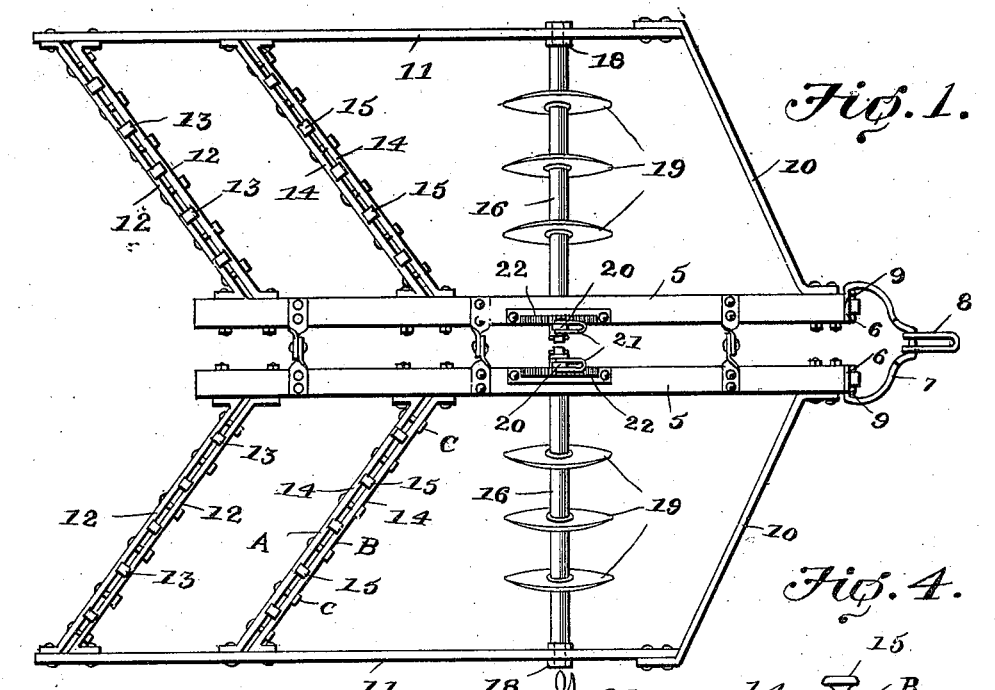
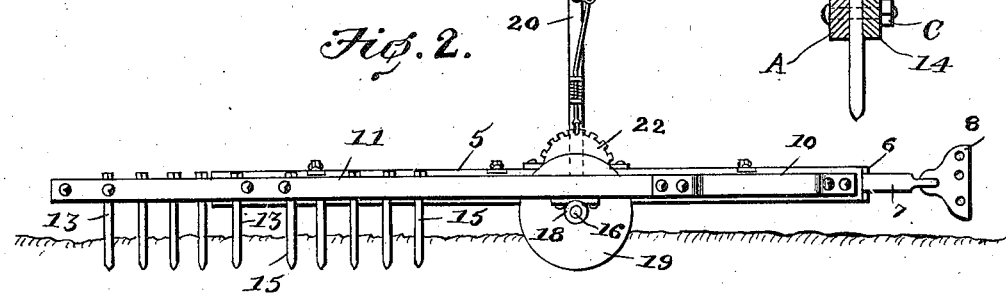
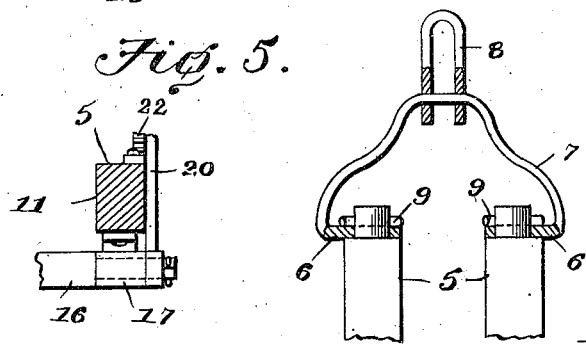
Witnesses
W. S. Rockwell
H. E. Chandler
Inventor
J. F. Williams
By Chandler & Chandler
Attorneys

UNITED STATES PATENT OFFICE.

JAMES F. WILLIAMS, OF STURGIS, MISSISSIPPI.

HARROW.

No. 847,036.    Specification of Letters Patent.    Patented March 12, 1907.

Application filed July 12, 1906. Serial No. 325,956.

*To all whom it may concern:*

Be it known that I, JAMES F. WILLIAMS, a citizen of the United States, residing at Sturgis, in the county of Winston, State of Mississippi, have invented certain new and useful Improvements in Harrows; and I do hereby declare the following to be a full, clear, and exact description of the invention, such as will enable others skilled in the art to which it appertains to make and use the same.

This invention relates to farm implements, and more particularly to harrows, and has for its object to provide an implement including both disks and teeth and which will be adjustable to vary the angle of the disks.

Another object is to provide a harrow including pivoted sections which will adjust themselves to the inequalities of the ground.

Other objects and advantages will be apparent from the following description, and it is to be understood that I do not desire to be limited to the exact details of construction shown and described, for obvious modifications will occur to a person skilled in the art.

In the drawings forming a portion of this specification and in which like numerals of reference indicate similar parts in the several views, Figure 1 is a top plan view of the invention. Fig. 2 is a side elevation. Fig. 3 is a detail section showing the mounting of the beams in the yoke. Fig. 4 is a detail section through one of the beams, showing the means for adjusting the teeth. Fig. 5 is a detail view, partly in section, showing the manner of connecting the levers with the shafts.

Referring now to the drawings, the present invention comprises two longitudinally-extending central beams 5, which are hinged together for independent vertical movement, and at their forward ends these beams are revolubly engaged in the inwardly-turned end portions 6 of a forwardly-extending yoke 7, which carries a clevis 8, the beams being reduced and rounded for engagement in the portions 6 and having pins 9 passed therethrough to prevent disengagement of the beams from the yoke.

Rearwardly-extending members 10 are carried by the beams at their forward portions, and side members 11 are secured to the rearward ends of the members 10, these members 10 extending laterally from the beams to bring the side members 11 in spaced relation thereto. The members 11 extend rearwardly beyond the beams 5, and tooth-bars 12 converge forwardly from the rearward ends of the members 11 to the beams 5, to which they are secured, and these tooth-bars carry harrow-teeth 13. Tooth-bars 14 extend diagonally between the members 11 and the beams 5, forwardly of the bars 12 and in parallel relation thereto and carry teeth 15.

Transverse shafts 16 are journaled in brackets 17, carried by the beams 5 at their inner ends, and at their outer ends in brackets 18, carried by the side members 11, these shafts extending at right angles to the beams, and fixed upon each of these shafts there is a plurality of ground-treating disks 19, which are disposed in parallel relation and which extend at an angle to the beams, and it will thus be seen that through rotation of the shafts 15 the angles at which the disks enter the ground may be varied. Levers 20 are connected with the shafts 16 for movement thereof, and a hand-latch mechanism 21 is provided for each lever and is adapted for engagement with a rack-segment 22, carried by the adjacent beam 5 to hold the shaft at different points of its movement.

The tooth-bars consist each of two sections A and B, between which the teeth are engaged, and bolts C are engaged through the two sections of each bar and are operable to clamp the sections against the teeth. It will be understood that the teeth may be set at different angles to suit different conditions.

What is claimed is—

A harrow comprising longitudinally-extending beams, pivotally connected for independent vertical movement, rearwardly and laterally extending front members secured to the beams, rearwardly-extending side members carried by the outer ends of the front members and extending in parallel relation to the beams and rearwardly therebeyond, forwardly, convergent tooth-bars secured to the rearward ends of the side members and to the beams, tooth-bars secured to the beams and side members forwardly of the first-named tooth-bars and in parallel relation thereto, ground-treating teeth carried by the bars, brackets carried by the beams and side members forwardly of the tooth-bars, transverse shafts journaled in the brackets, disks mounted upon the shafts, the disks of each shaft lying in parallel relation and at an angle to the beams, levers carried by the shafts for movement of the latter in their bearings, means for holding the levers with the shafts at different points of their movement, and a yoke having inwardly-turned end portions in which the forward ends of the beams are revolubly engaged, said yoke being adapted for the attachment of a draft-animal thereto.

In testimony whereof I affix my signature in presence of two witnesses.

JAMES F. WILLIAMS.

Witnesses:
J. J. WHILES,
W. E. GLENN.